(12) United States Patent
Civlin

(10) Patent No.: US 7,080,231 B2
(45) Date of Patent: Jul. 18, 2006

(54) PROCESSOR WITH TAGGING BUFFER AND METHODS FOR AVOIDING MEMORY COLLISIONS

(75) Inventor: Jan Civlin, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 235 days.

(21) Appl. No.: 10/273,714

(22) Filed: Oct. 18, 2002

(65) Prior Publication Data

US 2004/0078546 A1    Apr. 22, 2004

(51) Int. Cl.
G06F 12/00 (2006.01)

(52) U.S. Cl. ............... 711/202; 711/154; 711/156; 712/214

(58) Field of Classification Search .......... 711/23, 711/100, 112, 125, 163, 210, 1–3, 5, 104, 711/105, 126, 154, 207–208, 212–221; 712/214–217, 712/23, 126, 202, 206
See application file for complete search history.

(56) References Cited

U.S. PATENT DOCUMENTS

| | | | | |
|---|---|---|---|---|
| 5,519,841 A | * | 5/1996 | Sager et al. ............... | 711/202 |
| 5,619,662 A | * | 4/1997 | Steely et al. .............. | 712/216 |
| 5,832,276 A | * | 11/1998 | Feiste et al. .............. | 710/240 |
| 5,881,280 A | * | 3/1999 | Gupta et al. .............. | 712/244 |
| 6,505,293 B1 | * | 1/2003 | Jourdan et al. ........... | 712/217 |
| 6,505,296 B1 | * | 1/2003 | Morris et al. ............. | 712/244 |
| 6,631,460 B1 | * | 10/2003 | Morris et al. ............. | 712/217 |

\* cited by examiner

Primary Examiner—Donald Sparks
Assistant Examiner—Hashem Farrokh
(74) Attorney, Agent, or Firm—Martine Penilla & Gencarella, LLP

(57) ABSTRACT

A processor includes a tagging buffer for storing information that advises the processor of potential memory collisions caused by program instruction pairs that refer to the same memory address. In one method for avoiding memory collisions, a program having tagging code identifying program instruction pairs of the program that refer to a same memory address is compiled. The program instruction pairs in the compiled program code are processed while verifying an order in which the program instruction pairs are to be executed using the compiled tagging code, which is loaded into a tagging buffer. In another method, a program that does not include tagging code is compiled. When a trap occurs in the processing of a program instruction pair, program counters that cause the instructions to be executed in a desired order are added to a tagging buffer. A computer system including the processor also is described.

11 Claims, 5 Drawing Sheets

PROCESSOR WITH TAGGING BUFFER AND METHODS FOR AVOIDING MEMORY COLLISIONS

BACKGROUND OF THE INVENTION

The present invention relates generally to computer systems and, more particularly, to a processor having a tagging buffer, a computer system including the processor, and methods for avoiding memory collisions during execution of program instruction pairs.

In fashion pipelines, load instructions typically have priority over store instructions because load instructions should be executed faster than store instructions. As such, the execution of certain program instruction pairs, e.g., <st reg, [mem1]; ld [mem2], reg>, may degrade performance when the memory addresses are the same, i.e., mem1=mem2. The reason for this is that the CPU may execute the higher priority load operation first. This change in the order of execution will usually increase performance, however, when the memory addresses specified in the instruction pair are the same, a memory collision occurs and the wrong value will be loaded into the register, as explained in more detail below with reference to FIG. 1. To correct this error, the load instruction and all dependents of the load instruction should be discarded and then reissued and re-executed. Surely, this will degrade the execution performance significantly.

FIG. 1 is a schematic diagram that illustrates an exemplary error that may occur when an instruction pair that specifies the same memory address is executed in a different order. The exemplary instruction pair to be executed is <st reg1[mem1]; ld [mem2] reg2>and mem1=mem2, i.e., the memory addresses are the same. As shown in FIG. 1, registers 100 include registers 1 and 2 and memory 110 includes mem1 and mem2, which indicate the same memory address. The value in register 1 is X and the store instruction calls for this value to be stored in mem1. The load instruction then calls for the contents of mem2 to be loaded into register 2. Because X is to be loaded into mem1 and mem1=mem2, the desired contents of mem2 to be loaded into register 2 is the value X. However, when the load instruction is executed first, i.e., before the store instruction, the value Y, which is the original contents of mem2, will be incorrectly loaded into register 2, as shown in FIG. 1.

In view of the foregoing, there is a need for a method of identifying instruction pairs that refer to the same memory address at an early stage so that these instruction pairs can be executed in the proper order.

SUMMARY OF THE INVENTION

Broadly speaking, the present invention fills this need by providing a processor having a tagging buffer for storing information that advises the processor of potential memory collisions caused by program instruction pairs that refer to the same memory address. The present invention also provides a computer system including the processor and methods for avoiding memory collisions during execution of program instruction pairs.

In accordance with one aspect of the present invention, a processor is provided. The processor includes a tagging buffer for storing information corresponding to program instruction pairs of a compiled program that refer to the same memory address. In one embodiment, the program instruction pairs of the compiled program include a store instruction and a load instruction. In one embodiment, the tagging buffer is configured to receive the information corresponding to the program instruction pairs of the compiled program that refer to the same memory address from a compiler. In another embodiment, the tagging buffer is configured to receive the information corresponding to the program instruction pairs of the compiled program that refer to the same memory address from an operating system. In one embodiment, the tagging buffer exclusively stores information corresponding to program instruction pairs of the compiled program that refer to the same memory address.

In accordance with another aspect of the present invention, a first method for avoiding memory collisions during execution of program instruction pairs is provided. In this method, a program having tagging code identifying program instruction pairs of the program that refer to a same memory address is provided. The program is compiled to generate compiled program code and compiled tagging code. The compiled program code is loaded into an instruction buffer and the compiled tagging code is loaded into a tagging buffer. Thereafter, program instruction pairs in the compiled program code are processed while verifying an order in which the program instruction pairs are to be executed using the compiled tagging code. In one embodiment, the instruction pairs include a store instruction and a load instruction. In one embodiment, the loading of the compiled program code into the instruction buffer and the loading of the compiled tagging code into the tagging buffer occur in parallel.

In accordance with yet another aspect of the present invention, a second method for avoiding memory collisions during execution of program instruction pairs is provided. In this method, a program is provided. The program is compiled to generate compiled program code and the compiled program code is loaded into an instruction buffer. Thereafter, program instruction pairs in the compiled program code are processed. When a trap occurs in the processing of a program instruction pair, program counters that cause instructions of the program instruction pair to be executed in a desired order are added to a tagging buffer. In one embodiment, the contents of the tagging buffer are appended to the compiled program code.

In accordance with a further aspect of the present invention, a computer system is provided. The computer system includes a memory for holding data and a processor. The processor includes an instruction buffer and a tagging buffer. The instruction buffer stores program instructions of a compiled program and the tagging buffer stores information corresponding to program instruction pairs of the compiled program that refer to a same memory address. In one embodiment, the processor is configured to process program instruction pairs in the compiled program while verifying an order in which the program instruction pairs are to be executed using the information stored in the tagging buffer. In one embodiment, the memory is a random access memory (RAM). In one embodiment, the instruction buffer and the tagging buffer are temporary memory sections of the processor.

It is to be understood that the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate exemplary embodiments of the invention and together with the description serve to explain the principles of the invention.

DETAILED DESCRIPTION OF EXEMPLARY EMBODIMENTS

Figure 1:
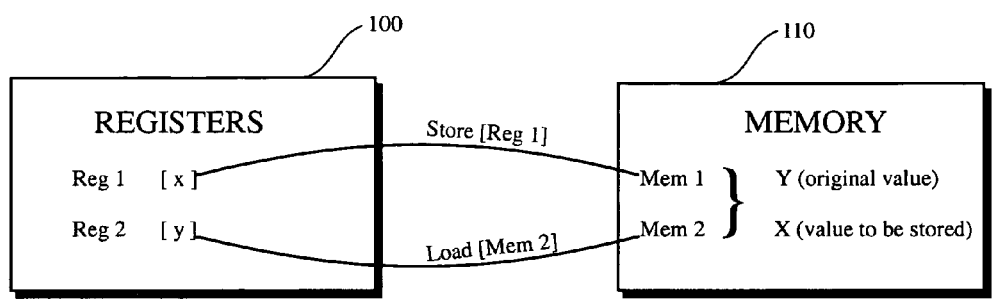
FIG. 1 is a schematic diagram that illustrates an exemplary error that may occur when a program instruction pair that specifies the same memory address is executed in a different order.

Several exemplary embodiments of the invention will now be described in detail with reference to the accompanying drawings. FIG. 1 has been described above in the "Background of the Invention" section.

Figure 2:
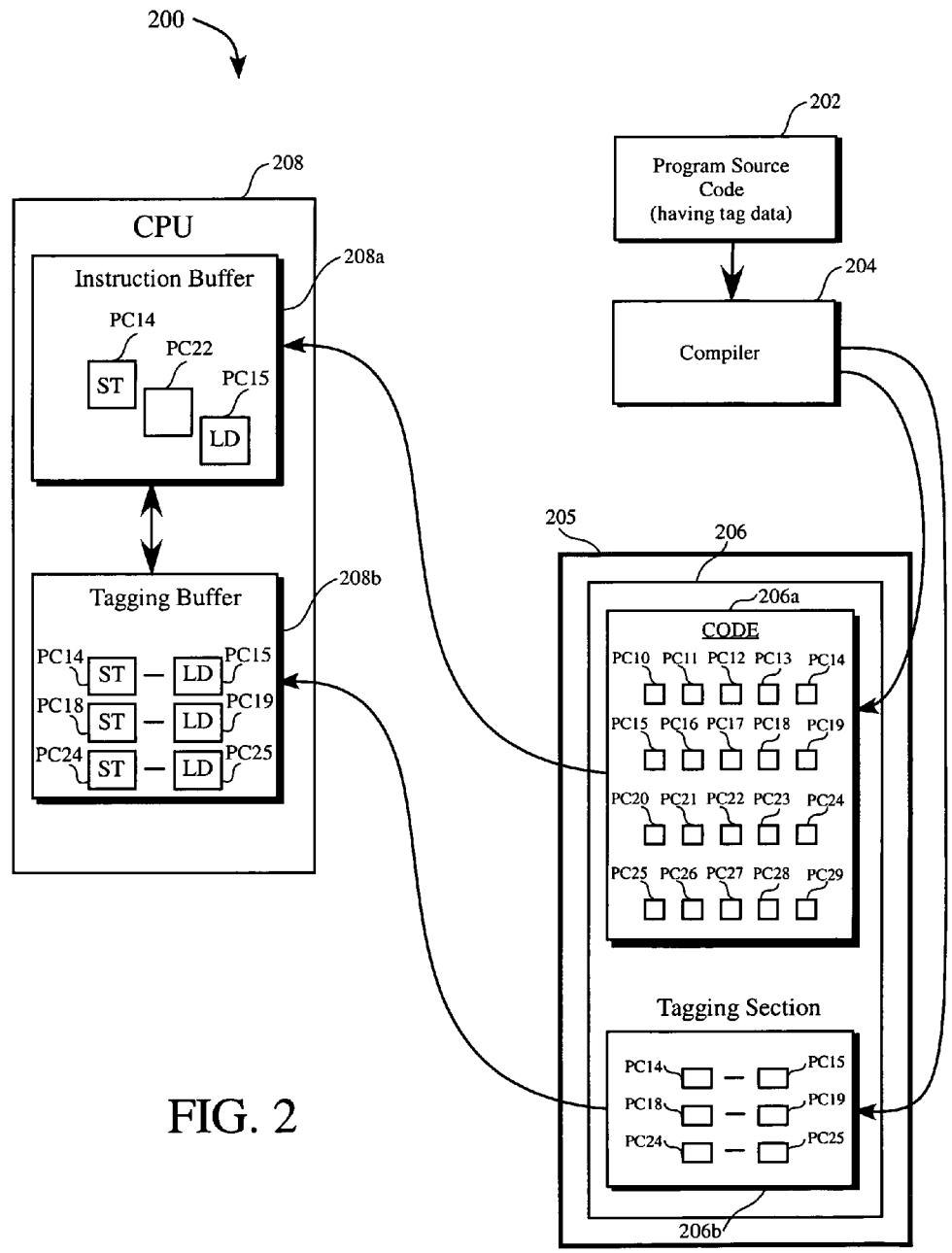
FIG. 2 is a schematic diagram that illustrates the operation of a processor having a tagging buffer in accordance with one embodiment of the invention.

FIG. 2 is a schematic diagram 200 that illustrates the operation of a processor having a tagging buffer in accordance with one embodiment of the invention. As shown in FIG. 2, program source code 202 includes tag data for identifying program instruction pairs that refer to the same memory address. Compiler 204 compiles program source code 202 into machine executable code 206, which, as is well known to those skilled in the art, is in binary format. Machine executable code 206 is stored in memory 205, which may be any suitable memory, e.g. random access memory (RAM). Machine executable code 206 includes compiled program code 206a and compiled tagging code 206b. Compiled program code 206a includes a plurality of program counters (PCs), which are designated in FIG. 2 as PC 10, PC 11, PC 12, etc. Compiled tagging code 206b identifies the instruction pairs in compiled programming code 206a that refer to the same memory address. As shown in FIG. 2, three instruction pairs (PC 14–PC 15, PC 18–PC 19, and PC 24–PC 25) that refer to the same memory address are identified in compiled tagging code 206b. In one embodiment, each of these instruction pairs includes a store instruction and a load instruction.

To execute the compiled code, compiled programming code 206a and compiled tagging code 206b are loaded into CPU 208, which includes instruction buffer 208a and tagging buffer 208b. More particularly, compiled programming code 206a is loaded into instruction buffer 208a and compiled tagging code 206b is loaded into tagging buffer 208b. In one embodiment, instruction buffer 208a and tagging buffer 208b are temporary memory sections, e.g., cache memory, of CPU 208. As shown in FIG. 2, tagging buffer 208b is located on CPU 208; however, it will be apparent to those skilled in the art that the tagging buffer also may be located off the chip by connecting the tagging buffer to the CPU with an appropriate bus. In one embodiment, the loading of compiled programming code 206a into instruction buffer 208a and the loading of compiled tagging code 206b into tagging buffer 208b occurs in parallel. In one embodiment, tagging buffer 208b exclusively stores compiled tagging code 206b. If desired, however, other data also may be stored in tagging buffer 208b.

During execution of compiled program code 206a by CPU 208, compiled tagging code 206b in tagging buffer 208b advises the CPU of instruction pairs that refer to the same memory address so that the CPU can execute these instructions in the proper order. In the case of an instruction pair including a store instruction and a load instruction that refer to the same memory address, e.g., PC 14 and PC 15, CPU 208 will first execute the store instruction, PC 14, and then execute the load instruction, PC 15. In this manner, the proper value will always be stored in the memory address and the need to perform extra operations to correct errors caused by memory collisions will be eliminated.

Figure 3:
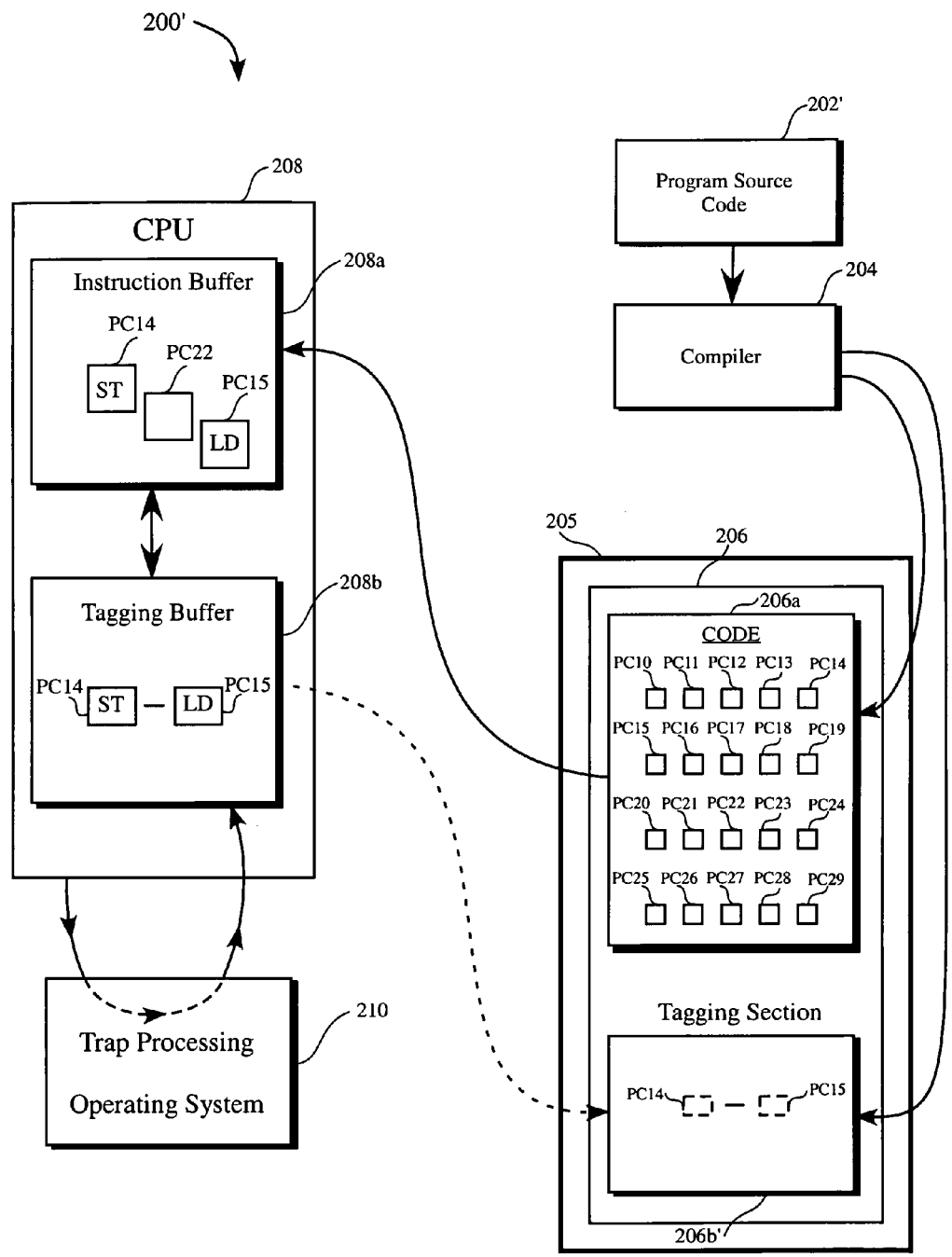
FIG. 3 is a schematic diagram that illustrates the operation of a processor having a tagging buffer in accordance with another embodiment of the invention.

FIG. 3 is a schematic diagram 200' that illustrates the operation of a processor having a tagging buffer in accordance with another embodiment of the invention. As shown in FIG. 3, program source code 202' does not include any tag data for identifying instruction pairs that refer to the same memory address. Compiler 204 compiles program source code 202' into machine executable code 206', which initially includes only compiled program code 206a' but later may include machine executable tagging code 206b', as will be explained later. Machine executable code 206' is stored in memory 205. To execute the compiled program code, compiled program code 206a' is loaded into instruction buffer 208a of CPR 208. During execution of compiled programming code 206a' by CPU 208, the CPU may execute higher priority instructions first and, consequently, the order in which certain instruction pairs are executed may be changed. As discussed above, when both a store instruction and a load instruction refer to the same memory address, changing the order in which the instructions are executed may cause an improper valued to be loaded.

As is well known to those skilled in the art, operating system 210 conducts trap processing to identify any errors that may have occurred in the execution of the compiled program code 206a'. During trap processing, a trap will occur if an instruction pair that refers to the same memory address, e.g., PC 14 and PC 15, was executed in the wrong order. When a trap occurs, operating system 210 will cause CPU 208 to execute the instruction pair again in the proper order and will record tag data identifying the program counters (PCs) of the instructions of the instruction pair that refer to the same memory address, e.g., PC 14 and PC 15, in tagging buffer 208b. As shown in FIG. 3, tagging buffer 208b is located on CPU 208; however, the tagging buffer also may be located off the chip, as discussed above with reference to FIG. 2. As the execution of compiled program code 206a' continues, the tag data in tagging buffer 208b advises CPU 208 of instruction pairs that refer to the same memory address so that the CPU can execute these instructions in the proper order. Thus, once tag data identifying the PCs of an instruction pair that refers to the same memory address has been added to tagging buffer 208b during a session, CPU 208 will always execute the instructions in the proper order during that session.

If desired, the contents of tagging buffer 208b may be saved to memory at the end of a session, e.g., when the program is closed, for use in future sessions. In one embodiment, machine executable code 206b', which includes the contents of tagging buffer 208b, is appended to the same file that contains compiled program code 206a'. Alternatively, machine executable code 206b' may be saved in a separate file that is associated with or otherwise linked to the file that contains compiled program code 206a'. At the start of a new session, e.g., when the program is opened, machine executable code 206b' may be loaded into tagging buffer 208b and used to advise CPU 208 of instruction pairs that refer to the same memory address so that the CPU can execute these instructions in the proper order.

Figure 4:
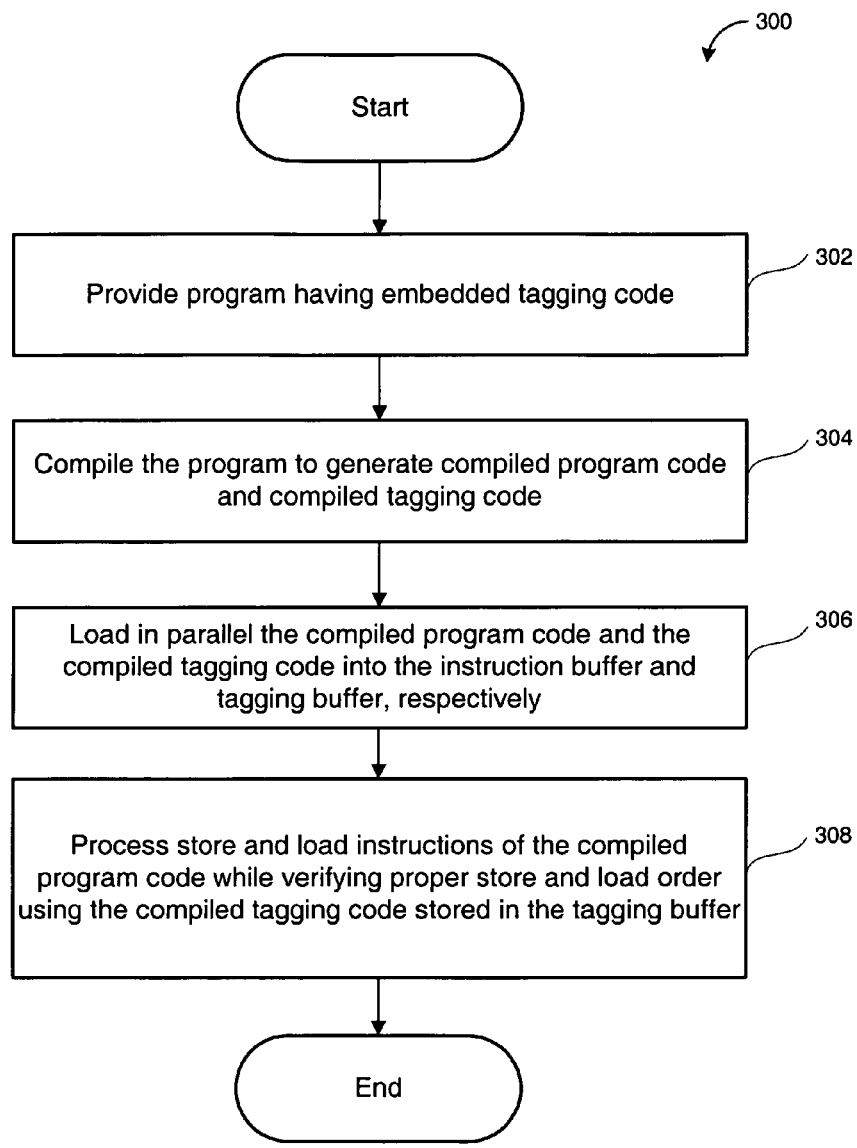
FIG. 4 is a flow chart diagram illustrating the method operations performed in avoiding memory collisions during execution of program instruction pairs in accordance with one embodiment of the present invention.

FIG. 4 is a flow chart diagram 300 illustrating the method operations performed in avoiding memory collisions during execution of program instruction pairs in accordance with one embodiment of the present invention. The method begins in operation 302 in which a program having embedded tagging code is provided. The tagging code identifies the instruction pairs in the program that refer to the same memory address. In one embodiment, each instruction pair includes a store instruction and a load instruction. In operation 304, the program is compiled to generate compiled program code and compiled tagging code. In operation 306, the compiled program code is loaded into an instruction buffer and the compiled tagging code is loaded into a tagging buffer. In one embodiment, the loading of the compiled program code into the instruction buffer and the loading of the compiled tagging code into the tagging buffer occur in parallel.

In operation 308, the compiled program code is executed by a suitable processor, e.g., a CPU. During execution of the compiled program code, the order in which any instruction pairs including a store instruction and a load instruction that refer to the same memory address are to be processed is verified using the compiled tagging code in the tagging buffer. Stated differently, the compiled tagging code in the tagging buffer advises the CPU of any instruction pairs that refer to the same memory address so that the CPU can execute these instructions in the proper order. Once all the instruction pairs including a store instruction and a load instruction that refer to the same memory address have been executed in the proper order, the method is done.

Figure 5:
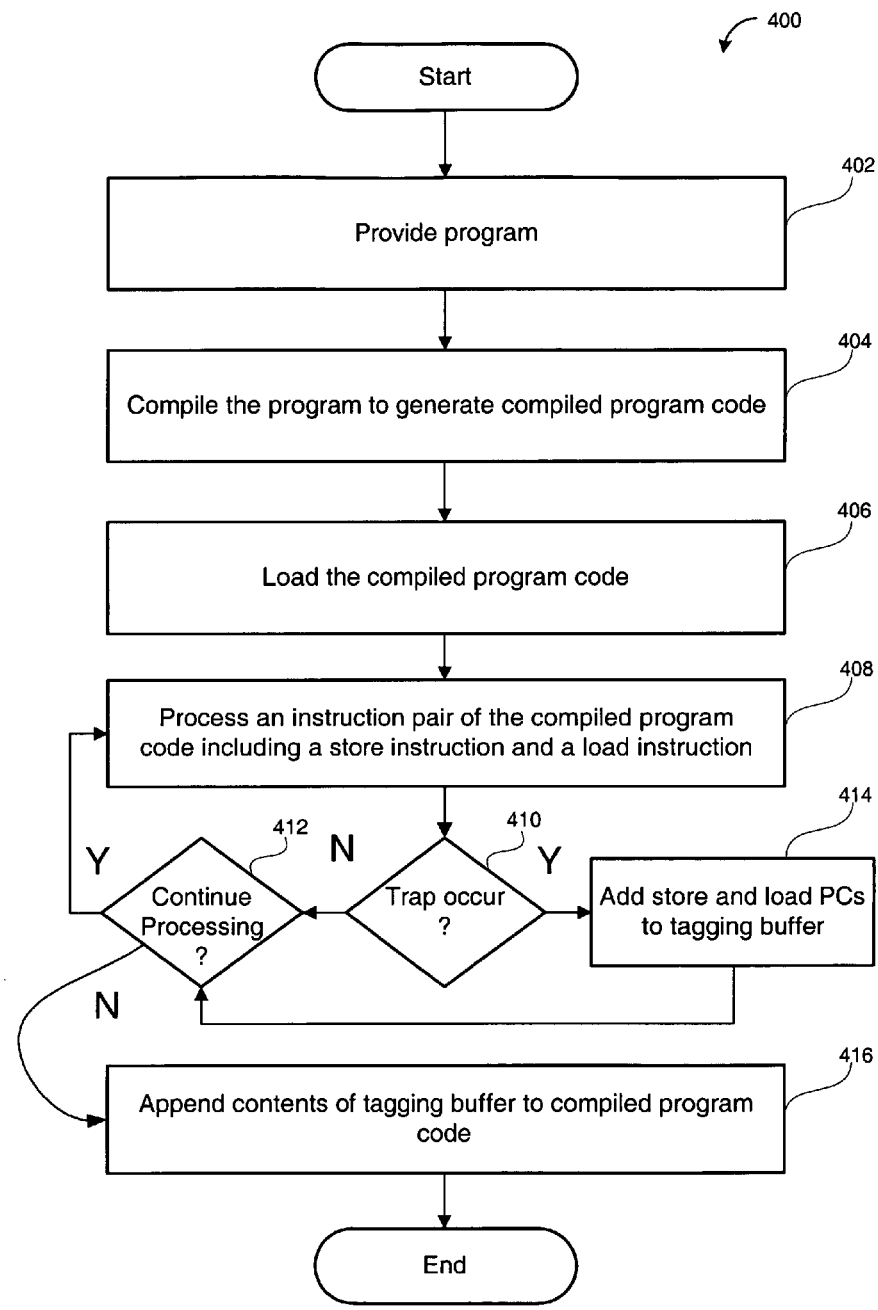
FIG. 5 is a flow chart diagram illustrating the method operations performed in avoiding memory collisions during execution of program instruction pairs in accordance with another embodiment of the present invention.

FIG. 5 is a flow chart diagram 400 illustrating the method operations performed in avoiding memory collisions during execution of program instruction pairs in accordance with another embodiment of the present invention. The method begins in operation 402 in which a program is provided. In contrast with the embodiment of the method illustrated in FIG. 4, the program does not have any embedded tagging code that identifies program instruction pairs that refer to the same memory address. Thus, existing programs can be used in the embodiment of the method illustrated in FIG. 5. In operation 404, the program is compiled to generate compiled program code. In operation 406, the compiled program code is loaded into an instruction buffer for execution. In operation 408, an instruction pair of the compiled program code is executed by a suitable processor, e.g., a CPU. During execution of an instruction pair including a store instruction and a load instruction, the CPU may execute the higher priority load instruction first and, as discussed above, this may cause an error to occur when the store instruction and the load instruction refer to the same memory address.

In decision operation 410, it is determined whether a trap occurred during trap processing of the compiled program code. As is well known to those skilled in the art, trap processing is performed by the operating system to uncover any errors that may have occurred during execution of the compiled program code by the CPU. For example, in the case of an instruction pair including a store instruction and a load instruction that refer to the same memory address, a trap may occur if these instructions are executed in the wrong order and, consequently, the wrong value is loaded. If it is determined that a trap did not occur, then the method proceeds to decision operation 412. If it is determined that a trap did occur, then the method proceeds to operation 414.

In operation 414, tag data identifying the store instruction and the load instruction that refer to the same memory address are added to a tagging buffer. In one embodiment, the program counters (PCs) of the store instruction and the load instruction that refer to the same memory address are added to the tagging buffer, e.g., PC 14 and PC 15 shown in FIG. 3. The next time this store instruction and this load instruction are to be executed during the session, the PCs in the tagging buffer will cause the CPU to execute these instructions in the proper order. Once the tag data has been added to the tagging buffer, the method proceeds to decision operation 412.

In decision operation 412, it is determined whether processing is to be continued. If it is determined that processing is to be continued, then the method returns to operation 408 for further processing. On the other hand, if it is determined that processing is not to be continued, e.g., the program is closed, then the method proceeds to operation 416. In operation 416, the contents of the tagging buffer, i.e., the tag data that identifies the program instruction pairs that refer to the same memory address, is appended to the compiled program code. In one embodiment, the contents of the tagging buffer is stored in the same file that contains the compiled program code. In another embodiment, the contents of the tagging buffer is stored in a separate file that is associated with or otherwise linked to the file that contains the compiled program code. When a new session is started, e.g., the program is opened, the appended tag data may be loaded into the tagging buffer and used to advise the CPU of instruction pairs that refer to the same memory address so that the CPU can execute these instruction pairs in the proper order. Once the contents of the tagging buffer has been appended to the compiled program code, the method is done.

It will be apparent to those skilled in the art that the order in which the method operations are performed may be varied from that described herein, e.g., by rearranging the order in which the method operations are performed or by performing some of the method operations in parallel. Further, while the present invention has been described in the general context of an application program that is executed on an operating system in conjunction with a test system, it should be appreciated that the invention may be implemented with other routines, programs, components, data structures, etc., which perform particular tasks or implement particular abstract data types. In addition, the present invention may be practiced with other computer system configurations including hand-held devices, microprocessor systems, microprocessor-based or programmable consumer electronics, minicomputers, mainframe computers, and the like.

With the embodiments described herein in mind, it should be understood that the present invention may employ various computer-implemented operations involving data stored in computer systems. These operations are those requiring physical manipulation of physical quantities. These quantities usually, but not necessarily, take the form of electrical or magnetic signals capable of being stored, transferred, combined, compared, and otherwise manipulated. Further, the manipulations performed are often referred to using terms such as producing, identifying, determining, or comparing.

Any of the operations described herein that form part of the present invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The present invention also can be embodied as computer readable code on a computer readable medium. The computer readable medium may be any data storage device that can store data which can be thereafter be read by a computer system. Examples of the computer readable medium include hard drives, network attached storage (NAS), read-only memory, random access memory, CD-ROMs, CD-Rs, CD-RWs, magnetic tapes, and other optical and non-optical data storage devices. The computer readable medium also can be distributed over network coupled computer systems so that the computer readable code is stored and executed in a distributed fashion.

In summary, the present invention provides a processor having a tagging buffer and methods for avoiding memory collisions during execution of program instruction pairs. The invention has been described herein in terms of several exemplary embodiments. Other embodiments of the invention will be apparent to those skilled in the art from consideration of the specification and practice of the invention. The embodiments and preferred features described above should be considered exemplary, with the invention being defined by the appended claims and equivalents thereof.

What is claimed is:

1. A processor, comprising:
a tagging buffer for storing information corresponding to program instruction pairs of a compiled program that refer to a same memory address, the tagging buffer being configured to receive the information corresponding to the program instruction pairs of the compiled program that refer to the same memory address from an operating system, and the tagging buffer being configured to store exclusively information corresponding to program instruction pairs of the compiled program that refer to the same memory address.

2. The processor of claim 1, wherein the program instruction pairs of the compiled program include a store instruction and a load instruction.

3. A method for avoiding memory collisions during execution of program instruction pairs, comprising:
providing a program having tagging code identifying program instruction pairs of the program that refer to a same memory address;
compiling the program to generate compiled program code and compiled tagging code;
loading the compiled program code into an instruction buffer and the compiled tagging code into a tagging buffer in parallel; and
processing program instruction pairs in the compiled program code while verifying an order in which the program instruction pairs are to be executed using the compiled tagging code.

4. The method of claim 3, wherein the instruction pairs include a store instruction and a load instruction.

5. A computer system, comprising:
a memory for holding data; and
a processor, the processor having an instruction buffer for storing program instructions of a compiled program, and a tagging buffer for storing information corresponding to program instruction pairs of the compiled program that refer to a same memory address, the tagging buffer being configured to receive the information corresponding to the program instruction pairs of the compiled program that refer to the same memory address from an operating system, and the tagging buffer being configured to store exclusively information corresponding to program instruction pairs of the compiled program that refer to the same memory address.

6. The computer system of claim 5, wherein the program instruction pairs of the compiled program include a store instruction and a load instruction.

7. The computer system of claim 5, wherein the tagging buffer is configured to receive the information corresponding to the program instruction pairs of the compiled program that refer to the same memory address from a compiler.

8. The computer system of claim 5, wherein the processor is configured to process program instruction pairs in the compiled program while verifying an order in which the program instruction pairs are to be executed using the information stored in the tagging buffer.

9. The computer system of claim 5, wherein the memory is a random access memory (RAM).

10. The computer system of claim 5, wherein the instruction buffer is a temporary memory section of the processor.

11. The computer system of claim 5, wherein the tagging buffer is a temporary memory section of the processor.

* * * * *